Jan. 24, 1933.   M. M. FRIEDEMANN   1,895,283
ADJUSTABLE STEPPED DISPLAY DEVICE
Filed Feb. 28, 1931   4 Sheets-Sheet 4
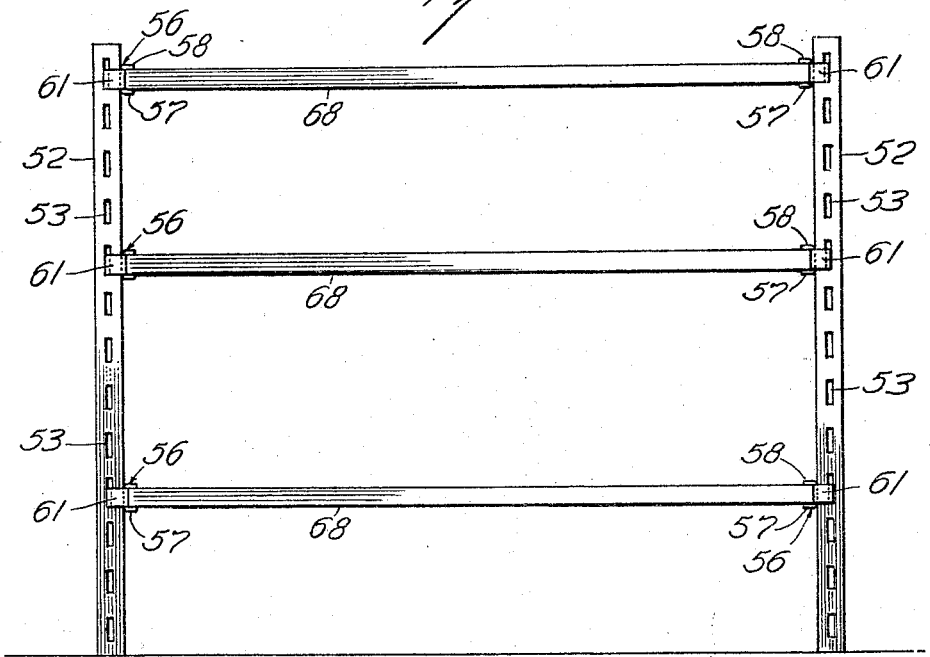
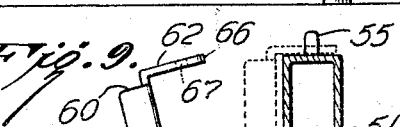
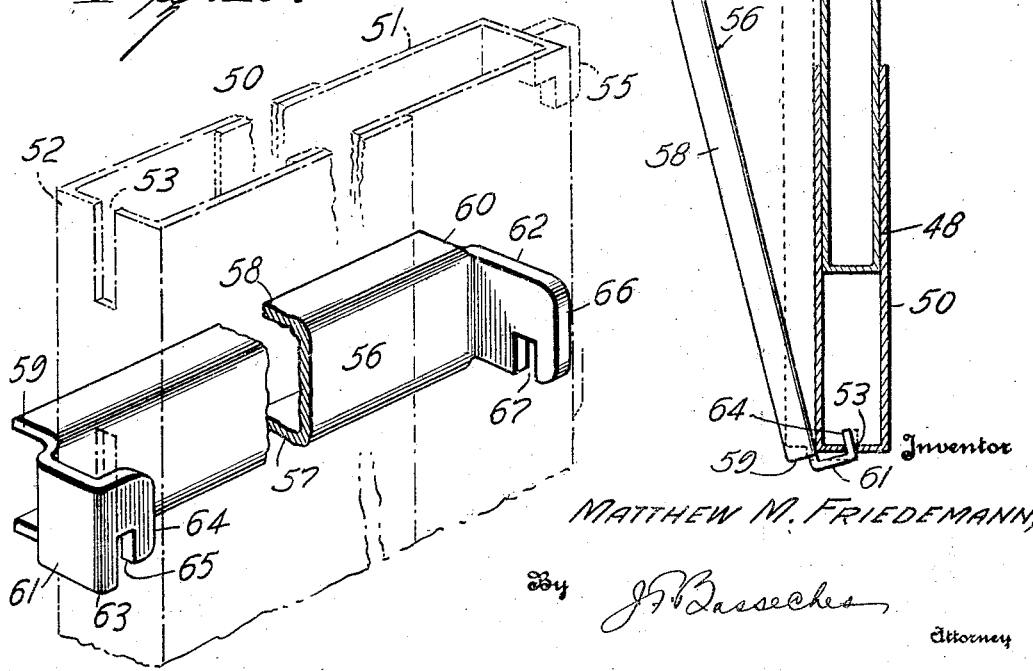
Matthew M. Friedemann,
Inventor Patented Jan. 24, 1933

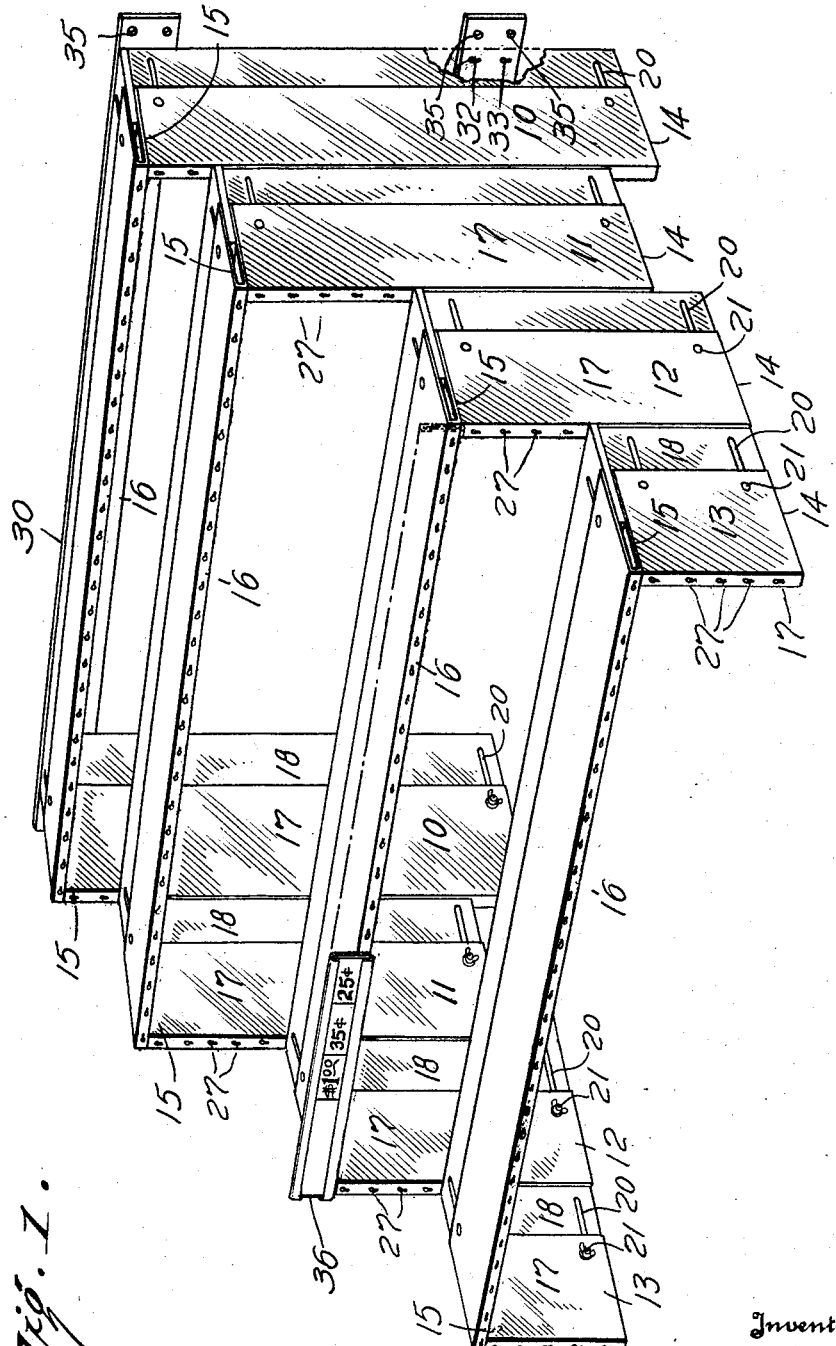

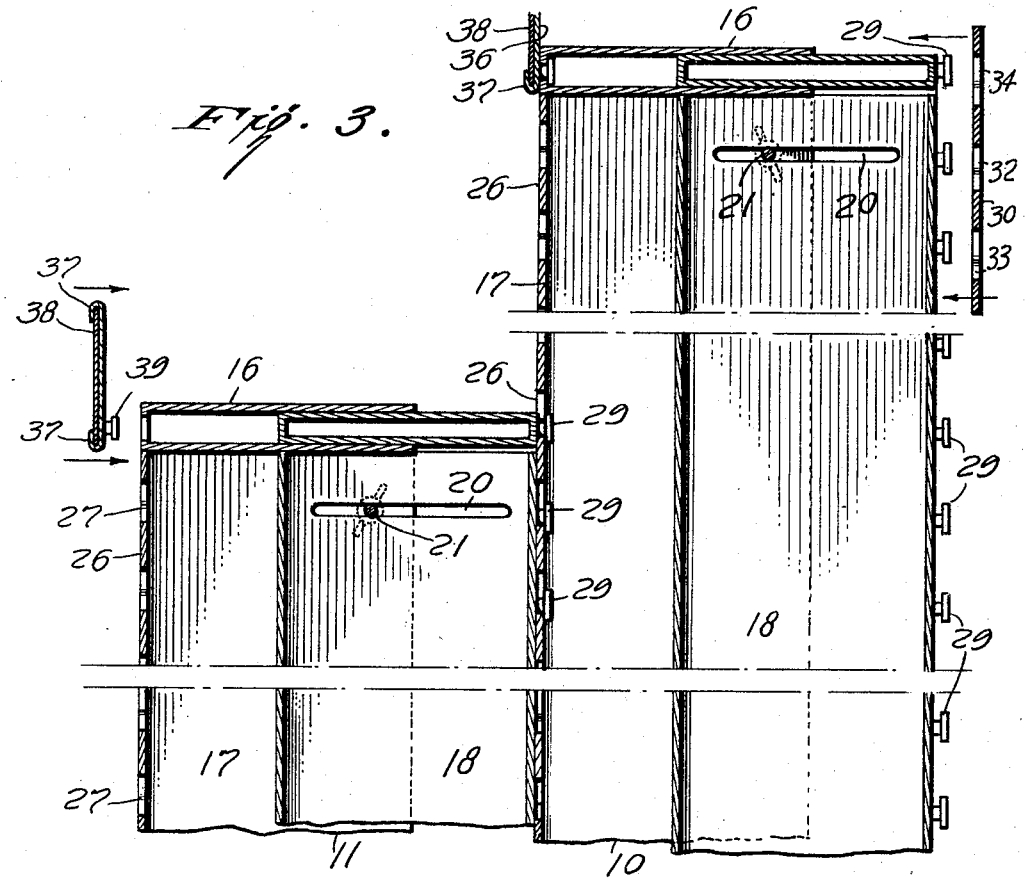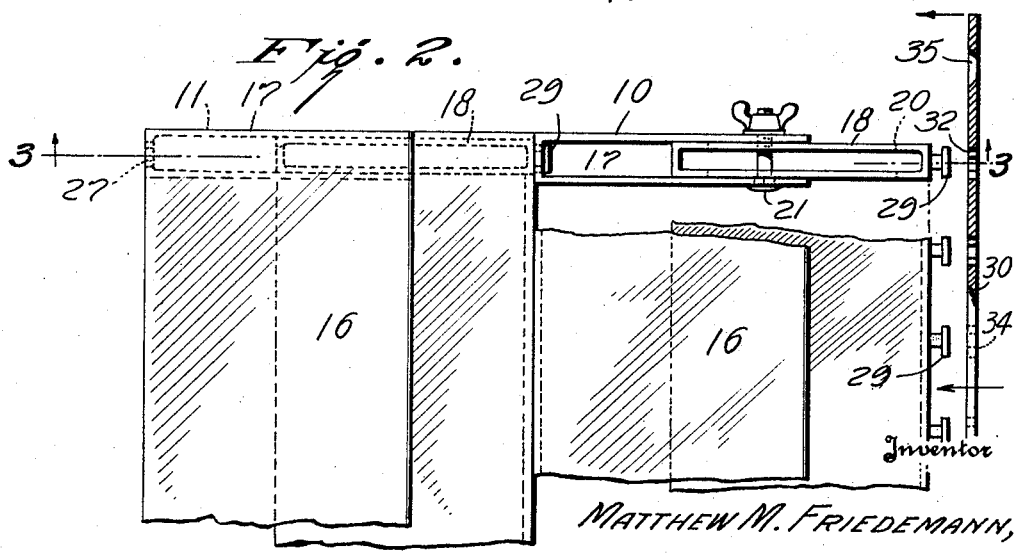

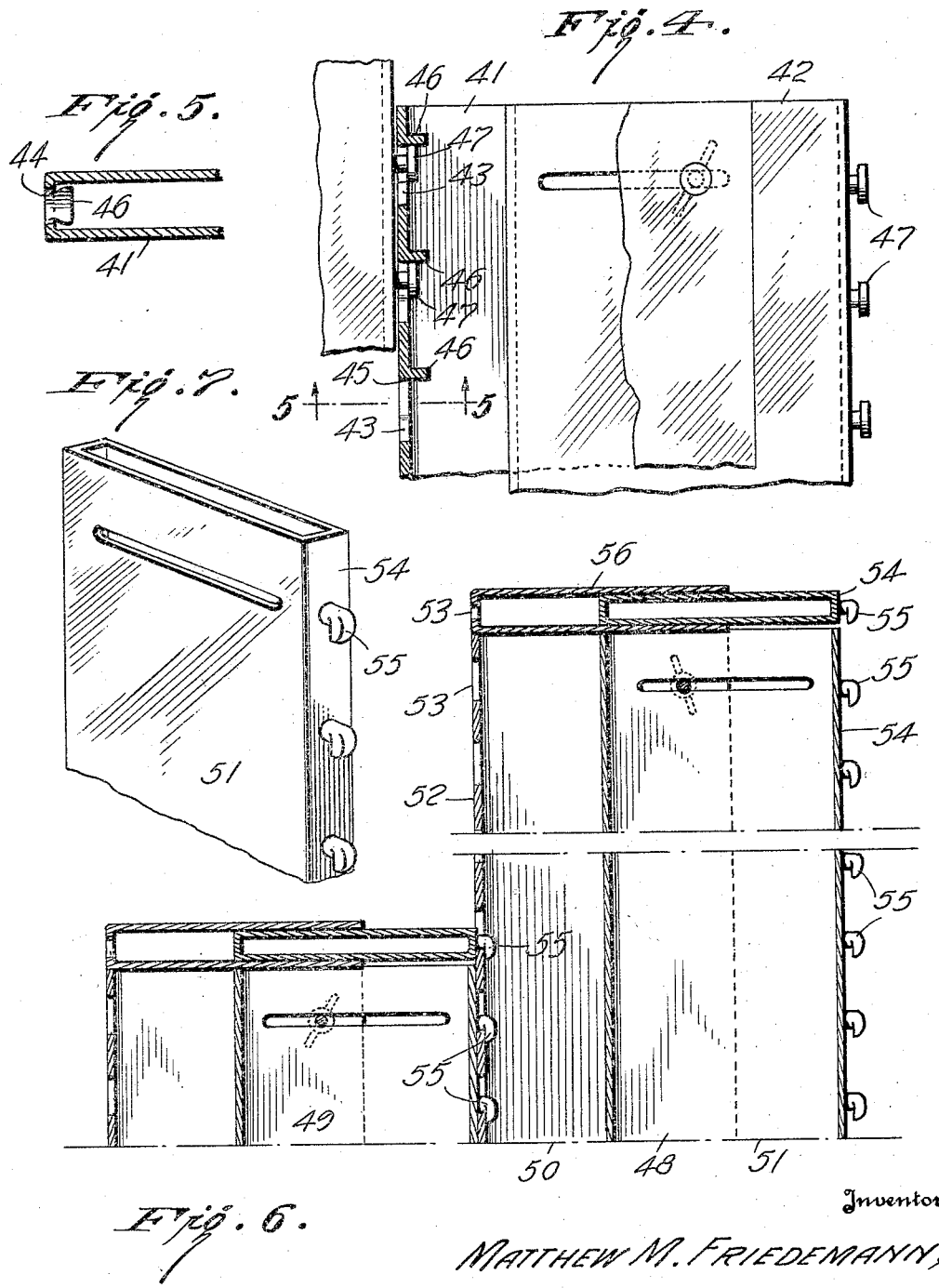

1,895,283

UNITED STATES PATENT OFFICE

MATTHEW M. FRIEDEMANN, OF NEW YORK, N. Y.

ADJUSTABLE STEPPED DISPLAY DEVICE

Application filed February 28, 1931. Serial No. 518,983.

This invention relates to display devices, more particularly to a display device in which merchandise may be exhibited upon a stepped or staggered formation.

It has been the common practice to fix up merchandise for display purposes, or for sales purposes, in stores or in show windows and show cases, by the arrangement of a rigid assembly of stepped shelving, so that the merchandise may be displayed in echelon. This type of assembly, as now provided, forms more or less of a permanent structure in show windows or a construction of such bulk to render the same inutile for large variations of display, or if used for variations of display, requires such space for storage as to discourage the use of this type of display, or to entail considerable expense, by reason thereof.

It is an object of my invention to provide a display assembly, comprising separable units which may be combined and to be built up into a display device, simulating stepped shelves, whereby a show window, show case or floor space may be provided with means for exhibiting merchandise, with the maximum display surface. It is contemplated by my invention to provide a display assembly in the nature of steps, or stairs, capable of being supported upon any flat surface, such as the store window, show case, or floor, whereby a rigid construction is provided, equivalent to the present stepped formation display device, but which is capable of being "knocked down" or dismantled for storage purposes, or for transportation, in accordance with some predetermined scheme of assembly.

It is a further object of my invention to provide a display assembly capable of supporting shelving in echelon, of any desired depth or height, and which is capable of modification in depth or height, or either of them, to accommodate the display for various sizes of merchandise, and in accordance with some predetermined display, the device being capable of dismantling to occupy the minimum amount of space, and equivalent to no more than the lumber which would be used if such type of shelving were utilized for construction of a stepped display device now commonly employed by window dressers for mechandising in store fronts, show cases or floor space of any establishment.

It is a further object of my invention to provide unit elements which may be stored conveniently and held in readiness whenever desired, so that the units may be built up into a display device equivalent in appearance and in rigidity of construction, to the present or stepped type of display shelf assembly. Thus, it is contemplated by my invention to provide stock units of varying lengths which may be quickly assembled to form the desired stepped uprights, upon which shelving may be mounted in echelon, to suit any convenient form of display so far as height, depth and numbers of shelves are concerned. Thus, by my invention, utilizing stock units or elements predeterminedly formed uprights of any character may be provided to support shelving made up of stock lumber or of these same units or elements, whereby any predetermined size of display may be provided, including various heights of and depths of shelving and display surface.

Other objects of my invention reside in the provision of a display device, which may be quickly and conveniently built up into a stepped assembly, for supporting shelving arranged in echelon, and providing all the rigidity and strength characteristic of this type of assembly, while, at the same time, providing an assembly which may be readily "knocked down" and dismantled for storage purposes, or for variation into different forms and shapes of displays.

It is further contemplated by me to provide a display device which may be built up into various sizes and forms of arrangement to suit any particular or predetermined design of display quickly and conveniently, at the point where the display is to be arranged, with such variations as occasion may demand, at the time of making the display. Thus it is contemplated by me to provide a display device which has extreme flexibility for arrangement of displays, sturdiness of construction to hold any required form of merchandise, simplicity of construction for attachment, and including parts thereof, so that they may occupy minimum space when in storage.

To attain these objects and such further objects as may appear herein or be hereinafter pointed out, I make reference to the accompanying drawings forming a part hereof, in which—

Figure 1 is a perspective view of my device;

Figure 2 is a fragmentary plan view of the same;

Figure 3 is a section taken on the line 3—3 of Figure 2;

Figure 4 is a longitudinal section through an element including a modification;

Figure 5 is a fragmentary section taken on the line 5—5 of Figure 4;

Figure 6 is a fragmentary sectional view of another modification taken in a direction similar to Figure 3 aforementioned, of my device;

Figure 7 is a perspective view of a portion of an element of the embodiment shown in Figure 6;

Figure 8 is a front elevation of still another embodiment of my invention;

Figure 9 is a longitudinal section of an element shown in Figure 8, and the method of attachment of the shell bracket used in connection with this embodiment;

Figure 10 is a perspective view of the same.

Making reference to the drawings, it will be observed that in its preferred form, my device is capable of providing a stepped display assembly, generally disclosed in Figure 1. This device comprises a plurality of vertical members 10, 11, 12 and 13, comprising uprights whose bottom edges 14 are arranged to preferably rest upon a level surface, such as a floor of a show room, show case, show window, or the top of a show case. The upper edges 15 serve as supporting surfaces or stiles for the shelving 16. In my preferred form, it is contemplated by me to provide both the uprights, as described, and the shelving, of substantially identically finished material, and these elements are each composed of telescopically connected frontal sections 17 and rear sections 18. The section 18 includes, in its side walls 19, a pair of longitudinal slots 20, in corresponding position to orifices 21, formed in the side walls 22 and 23 of the front sections 17 and 18 through the orifices and slots described. A bolt 24 passes through the orifices 21 and the slots 20. A wing nut 25 being preferably provided to tension the bolt 24 as will readily appear as this description proceeds. A front edge 26 of the section 17 is provided with a series of equally spaced key hole slots 27. The section 18 is provided at its rear edge 28 with a series of T-headed studs 29. The position of these studs corresponds substantially identically with the position of the key holes previously described, and the enlarged head of the studs are calculated to readily pass through the enlarged opening of the key holes.

In my preferred construction, the front section 17, and the rear section 18 may be made of metal stampings, with the rear section 18 formed of tubular material. This, however, as will be readily understood, may be made of solid stock.

Though I have described each of the elements including the uprights and shelving as made of telescopically connected front sections 17 and rear sections 18, it will be readily understood and it is contemplated by me to make these parts interval and of standard widths, in which event the front edge is provided with key hole slots, and the rear edge with the T-headed studs.

The elements of the character thus described are preferably assembled by predeterminedly positioning the rearmost uprights 10 spaced at a distance from each other, determined by the width of the stepped display which is to be provided.

In my preferred form of the device, I provide a pair of tie plates 30 and 31 each of which includes at least two pairs of key holes 32 and 33 vertically arranged and as many key holes horizontally arranged in pairs as desired, particularly for the uppermost shelving as shown, these key holes may be placed at corresponding positions to the studs 29 as show at 34.

The tie plates 30 and 31, as thus described, preferably fasten to a fixed wall by means of the screw holes 35 provided for this purpose. However, where no wall is readily available, these plates may be eliminated and suitable standards provided in their stead.

With the tie plates properly positioned, the first or tallest uprights 10 are hooked into position by causing engagement with the studs 29 with the key holes 32 and 33 of each of the tie plates 30 and 31. This connection will provide a sturdy lateral support for the assembly which will subsequently be arranged and built up upon the uprights 10 thus positioned. Where the uprights 10 include telescopically connected sections 17 and 18 respectively, this upright is then adjusted to the desired width by loosening the wing nuts 25, sliding the front sections 17 outwardly, and then when the proper width has been determined, locking the wing nuts 25. To the uprights as thus positioned and arranged, there are attached the uprights 11, by positioning the headed studs 29 into locking engagement with the key holes 27 of the uprights 10. The upright 11 is so chosen to give the desired variation in height. Should it be determined, however, that the variation of the edges 15 of the sections 10 and 11 respectively, are to be of different heights, the entire section 11 is then moved to engage a different series of key hole slots, in accordance with the position desired of the edge 15 of the section 11, in respect to the edge 15 of the section 10. Thus it will be observed that the lower edge of the upright 11 will, under these conditions not be in line with the lower edge of the section 10. Intermediate variations will appear to be possible, whenever desired. Then the assembly of the display device may be continued to include as many uprights as desired, by attaching sections such as 12 and 13 respectively, in keyed engagement at the edges, depending on the height or length of the uprights provided.

It is contemplated by me to provide the elements in various lengths, beginning with 6'' to any length desired, for the purpose of providing various stepped uprights with intermediate variations depending upon the relative position occupied by one upright as compared with the rear of the upright to which it has been attached, by the headed stud and key hole connection. When the desired number of steps have been built up, shelving members are applied to the upper edges 15 of each of the uprights. These shelving members may be stock lumber, preferably however, they are to be identical with the upright elements, but of a length corresponding at least to the distance between the uprights 10 and 11. The uppermost shelving 16 may be positioned upon the upright 10 by merely lying the same thereover. Preferably, however, the studs 29 at the rearmost section thereof, are made to engage the series of key holes 34, provided in the tie plate 30.

The annexed shelf which is to be supported at the uprights 11 is similarly positioned and in positioning the shelf, the studs 29 are also caused to engage the key holes at the front edge 26 of the upright 10. The number of shelves are then positioned in accordance with the number of uprights.

It is preferred by me also to provide a shelf guard 36 and this comprises a length of stripping material bent in at the edges 37, arranged to hold the price tag or card 38 between the bent in portion. The rear of this strip is provided with a number of T-headed studs 29 arranged to engage the key holes of the horizontally disposed elements or shelving members 16, in a manner more clearly indicated in Figures 1, 2 and 3. It will be obvious, of course, that where merely a shelf guard is desired, to prevent materials from falling or being displaced from the shelving, the device need not be formed for holding price tags or the like and the individual taste of the designer may be utilized.

In Figures 4 and 5 I have shown an enlarged detail of another form of element 40, in which a front section 41 and a rear section 42 are arranged in telescopic connection, as in the embodiment previously described. The front section 41 is similarly provided with key hole openings 43, the enlarged opening thereof, 44, however, has adjacent its upper surface 45, an inwardly turned lip 46. In this type of construction, where I provide a T-headed stud 47, the enlarged portion may pass through the opening 44 and is thereby guided by the inwardly turned lip 46. The section carrying the studs may then be driven home over the reduced portion of the key hole slot. In reversing the operation and disconnecting the studs from the key hole slots, the enlarged heads 47 will be stopped by the lip 46 to prevent further upward modification and then the enlarged head 47 may be readily withdrawn through the opening 44, without any further difficulty.

In the embodiments illustrated in Figures 6 and 7, uprights 48 and 49 are provided each of which comprises sections 50 and 51 respectively of the same general characteristics as the uprights previously described. However, the front edge 52 of the section 50 is provided with elongated slots 53 of a general uniform cross-section. The rear section 51 has adjacent the rear edge 54, by attaching to this edge, either by riveting or stamping, hooked members 55 spaced at positions corresponding to the slots 53. These sections as thus described may be used for shelving 56 by disposing the same over the edge of the uprights 48 and 49. In other respects, the embodiment shown and illustrated in Figures 6 and 7 may be utilized as the construction which has been previously illustrated, in forming the display shown in Figures 1, 2 and 3, the advantage residing in the fact that the parts are reversable, in that hooked engagement may be made either downwardly or upwardly, depending upon whether the sections suspended from the uprights will be required to resist a tilting stress from the front of the display to the back, or from the back of the display to the front. This type of construction also permits ready assembly beginning from a front and shorter upright and backwardly to a longer upright, merely by reversing the hooked members 55 to have the over-hang thereof point upwardly instead of downwardly as illustrated.

In the embodiment illustrated in Figure 8, uprights of the character described in Figures 6 and 7 may be utilized for arranging a display of somewhat the same character, but varying slightly. In this construction, a pair of spaced uprights such as 48 are provided. The telescopic sections 50 and 51 are adjusted to the desired depth. There are then provided a plurality of brackets or hangers 56. This bracket comprises a channel member having inwardly directed flanges 57 and 58. The channel is of a length corresponding to the adjusted position of the sections 50 and 51. At the ends 59 and 60 of the channel there are provided inwardly directed flanges 61 and 62 respectively. The flange 61 has a returned bent portion 63, including at its lower edge, a downwardly hooked member 65. The inwardly turned flange 62 has its extreme edge 66 provided with a hooked member 67. In positioning these brackets, the inwardly turned flange 61 has its inwardly directed portion 64 inserted into a slot 63 by tilting the bracket, as shown in Figure 9. The bracket is then moved to lie flush with the side upright, as shown in the dotted position in Figure 9, and then the bracket is slid down. This portion serves to hook the hooked portion 65 over the bottom wall 63, and at the same time hooks the hooked portion 67 over the member 55 of the upright. As many of these brackets are provided as desired, depending upon the spacing and number of shelves to be supported. The brackets, as will be readily understood are provided for attachment to the left or to the right upright, and for this reason will be supplied with the parts oppositely directed in symmetrical position. However, a single type of bracket may be provided by merely reversing the position of the uprights so that in its front surface as shown in Figure 8, there will appear the slots on one upright and the hooked members on the other upright, facing in one direction.

When the brackets 56 are positioned, shelving members 68 may thereafter be disposed between the walls 57 and 58. These shelving members may include members similar to the sections provided in forming the uprights and may therefore be adjusted to any width desired. The shelving 68 may, however, be formed of stock lumber or glass plate, and a stepped assembly be provided by forming the uppermost shelf 68 of narrower width than the lowermost shelf. Likewise where sections corresponding to the uprights are used for shelving, a similar stepped effect may be obtained by arranging the sections 50 and 51, when these members are used for shelving, to various widths.

It will thus be observed that I have provided a display assembly, as well as elements for forming a display assembly, which has a wide range of utility. Thus standard elements may be provided in varying lengths if so desired, and which may be conveniently stored and occupy the minimum space when so stored. The elements may then be brought together through any restricted space, such as the door leading to a store front, or show case, and then be assembled into any desired stepped assembly, which would otherwise be impossible if made in accordance with the present practice of providing a stepped display device of permanent construction. The elements as described may when so assembled, be varied to suit the display under consideration, so that various heights and widths of shelving may be provided. Thus the merchandise may be displayed in echelon with maximum effectiveness, and the display assembly provided in accordance with the merchandise to be displayed, rather than try to accommodate the merchandise to the type of display device which may be now available.

It will also be observed that no tools or permanent preparation are necessary to assemble the elements and when the elements are assembled, rigidity of construction is possible for any purpose whatsoever, in respect to the size, weight, and number of articles to be displayed.

Having thus described my invention and illustrated its use, what I claim as new and desire to secure by Letters Patent, is:—

1. A display assembly, comprising a plurality of uprights arranged to be disposed in stepped formation, for supporting shelves in echelon, and means for separably and interchangeably connecting said uprights to each other.

2. A display assembly, comprising shelving members arranged to be disposed in echelon, and supporting uprights for such shelves, said uprights comprising independent separably and interchangably connected members, including means for attaching said members to each other in variable positions, vertically.

3. A display assembly, comprising shelving members arranged to be disposed in echelon, and supporting uprights for such shelves, said uprights comprising independent separably connected members, including means for attaching said members to each other in variable positions, vertically, said members comprising telescopically connected portions, whereby the depth of the shelf supporting area may be varied.

4. A display assembly, comprising shelving members arranged to be disposed in echelon, and supporting uprights for such shelves, said uprights comprising independent separably connected members, including means for attaching said members to each other in variable positions, vertically, said members being composed of a main section, and an extensible section connected thereto, whereby the depth of the supporting surface of the uprights may be varied.

5. A display assembly, arranged to support shelving in echelon, comprising spaced uprights composed of independent members in edge to edge connection, each edge of said members including a series of complemental portions of fasteners, arranged to hold the adjacent members in varying relative heights, whereby the shelving supporting surface may be varied.

6. A display device arranged to form a stepped assembly, a rigid member adapted to act as shelving or an upright, and comprising on opposite edges complemental portions of fastening elements, whereby similar elements may be assembled in edge to edge contact to provide stepped uprights.

7. A display device arranged to form a stepped assembly, a rigid member adapted to act as shelving or an upright, and comprising on opposite edges complemental portions of fastening elements, whereby similar elements may be assembled in edge to edge contact to provide stepped uprights, said element comprising separably connected portions whereby the width of said element may be varied.

8. An element of the character described in claim 6, said element comprising separably connected sections in telescopic engagement, and means to hold said sections in predetermined widths.

In witness whereof I have hereunto signed my name this 20 day of February, 1931.

MATTHEW M. FRIEDEMANN.